US011286390B2

(12) United States Patent
Fieten et al.

(10) Patent No.: US 11,286,390 B2
(45) Date of Patent: Mar. 29, 2022

(54) ANTIMICROBIAL SURFACTANTS AND WATER BORNE COATINGS COMPRISING THE SAME

(71) Applicant: Van Wijhe Beheer B.V., Zwolle (NL)

(72) Inventors: Bram Fieten, Utrecht (NL); Jan Wessels, Groningen (NL); Rainier Antonius Hermanus Brookhuis, Weerselo (NL); Marie Louise Van Wijhe, Zwolle (NL); Jacobus Antonius Loontjens, Bunde (NL); Pei Zhao, Guangzhou (CN); Hendrik Jan Busscher, Thesinge (NL); Henderina Catharina Van Der Mei, Harkstede (NL); Stefan Wouter Wessel, Groningen (NL); Francesco Mecozzi, Manchester (GB); Marianne Driesse, Zwolle (NL)

(73) Assignee: Van Wijhe Beheer B.V., Zwolle (NL)

( * ) Notice: Subject to any disclaimer, the term of this patent is extended or adjusted under 35 U.S.C. 154(b) by 0 days.

(21) Appl. No.: 16/331,372

(22) PCT Filed: Sep. 7, 2017

(86) PCT No.: PCT/NL2017/050587
§ 371 (c)(1),
(2) Date: Mar. 7, 2019

(87) PCT Pub. No.: WO2018/048302
PCT Pub. Date: Mar. 15, 2018

(65) Prior Publication Data
US 2019/0359828 A1    Nov. 28, 2019

(30) Foreign Application Priority Data
Sep. 7, 2016   (NL) ...................... 2017429

(51) Int. Cl.
*C08L 101/00*   (2006.01)
*C08G 18/08*   (2006.01)
(Continued)

(52) U.S. Cl.
CPC ...... *C08L 101/005* (2013.01); *C08G 18/0814* (2013.01); *C08G 18/2865* (2013.01); (Continued)

(58) Field of Classification Search
CPC ............ C08L 101/005; C08L 101/025; C08G 18/2875; C08G 18/2865; C08G 18/0814; (Continued)

(56) References Cited

U.S. PATENT DOCUMENTS

2006/0035091 A1   2/2006   Bruchmann et al.
2009/0238889 A1*  9/2009   Weide .................... A01N 43/40
424/497
(Continued)

FOREIGN PATENT DOCUMENTS

CN        102264789 A        11/2011
WO   WO 2016/083819 A1 *   6/2016
WO   WO 2016/123987 A1 *   8/2016

OTHER PUBLICATIONS

Xiang et al.: One-Pot Synthesis for Biocompatible Amphiphilic Hyperbranched Polyurea Micelles, Macromolecules, 2013, 46, 4418-4425.*
(Continued)

*Primary Examiner* — Hong Yu
(74) *Attorney, Agent, or Firm* — Verrill Dana, LLP

(57) ABSTRACT

The invention relates to novel antimicrobial surfactants and their application in antimicrobial coating systems, in particular water borne coatings. Provided is a method for providing an antimicrobial surfactant, comprising the steps of: (a) providing a hyperbranched polyurea having blocked
(Continued)

Figure 1:
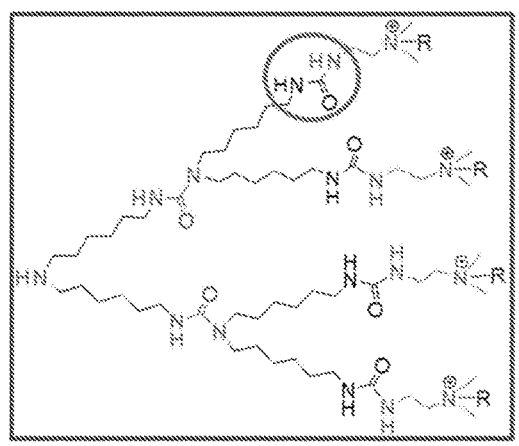
Figure 1:
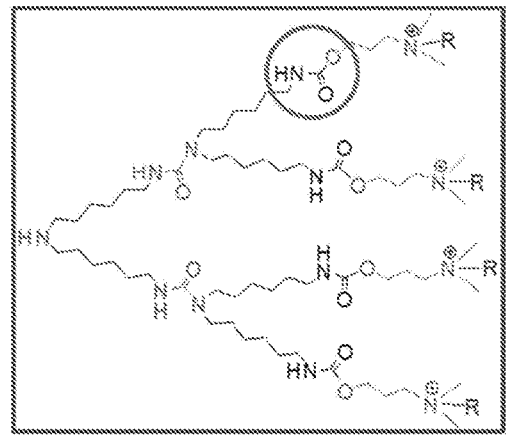

Panel A isocyanates at the end of the polymer branches by the polycondensation of $AB_2$ monomers; (b) introducing tertiary amine groups by reacting said blocked isocyanates of the hyperbranched polyurea with a tertiary amine compound that is functionalized with —OH, —NH$_2$, —SH, or —COO—; and (c) quaternization of said tertiary amine groups by reacting with an alkylating agent to obtain a quaternized hyperbranched polymer having antimicrobial surfactant properties.

16 Claims, 5 Drawing Sheets

(51) Int. Cl.
  C08G 18/28  (2006.01)
  C08G 18/80  (2006.01)
  C08G 83/00  (2006.01)
  C08L 101/02  (2006.01)
  C09D 175/04  (2006.01)
  C09D 201/00  (2006.01)
  C09D 201/02  (2006.01)
  C09D 5/14  (2006.01)
  C09D 5/02  (2006.01)

(52) U.S. Cl.
  CPC ..... *C08G 18/2875* (2013.01); *C08G 18/8074* (2013.01); *C08G 83/006* (2013.01); *C08L 101/025* (2013.01); *C09D 5/14* (2013.01); *C09D 175/04* (2013.01); *C09D 201/005* (2013.01); *C09D 201/025* (2013.01); *C09D 5/025* (2013.01)

(58) Field of Classification Search
  CPC .... C08G 18/8074; C08G 83/006; C09D 5/14; C09D 175/04; C09D 201/005; C09D 201/025; C09D 5/025
  See application file for complete search history.

(56) References Cited

U.S. PATENT DOCUMENTS

| | | | | |
|---|---|---|---|---|
| 2011/0105333 | A1* | 5/2011 | Israels | A01N 25/24 504/360 |
| 2011/0217255 | A1* | 9/2011 | Kim | C08L 67/00 424/70.11 |
| 2018/0092356 | A1* | 4/2018 | Chen | C07C 309/14 |

OTHER PUBLICATIONS

Kapse et al. (Polymeric micelles: a ray of hope among new drug delivery systems: retrieved from internet: https://www.sciencedirect.com/topics/pharmacology-toxicology-and-pharmaceutical-science/critical-micelle-concentration. Relieved on Sep. 2, 2021.*

Zhang, Yi, et al., "Synthesis and antibacterial characterization of waterborne polyurethanes with gemini quaternary ammonium salt", Science Bulletin, Science China Press, Heidelberg; vol. 60, No. 12, May 31, 2015 (May 31, 2015), pp. 1114-1121, XP035489913, DOI: 10.1007/s11434-015-0811-2.

Lia, A., et al., "A Shape-Adaptive, Antibacterial-Coating of Immobilized Quaternary-Ammonium Compounds Tethered on Hyperbranched Polyurea and its Mechanism of Action", Advanced Functional Materials, vol. 24, Issue 3, Jan. 22, 2014, pp. 346-355. DOI: 10.1002/adfm.201301686.

Asri, L.A.T.W.. "Immobilized hyperbranched polyureas coatings with antibacterial performance", Thesis at University of Groningen, Jan. 1, 2014, pp. 1-177, retrieved from the Internet: URL: www.rug.nl/research/portal/files/3660759/Lisa_Asri_PhD_Thesis.pdf.

Chen, K., et al., "Synthesis and Application of a Hyperbranched Polyester Quarternary Ammonium Surfactant", Journal of Surfactants and Detergents, vol. 17, No. 6. Nov. 1, 2014 (Nov. 1, 2014) pp. 1081-1088. DOI 10.1007/s11743-014-1624-z.

Xiang, F. et al., "Preparation of AB2 Monomers and the Corresponding Hyperbranched Polyureas in a One-Pot Procedure", Macromol. Chem. Phys. 2012, vol. 213, 1841-1850.

* cited by examiner

A

1. HBP-NH$_2$-C1
2. HBP-NH$_2$-C2
3. HBP-NH$_2$-C4
4. HBP-NH$_2$-C6
5. HBP-NH$_2$-C8
6. HBP-NH$_2$-C10
7. HBP-NH$_2$-C12

B

8. HBP-OH-C1
9. HBP-OH-C2
10. HBP-OH-C4
11. HBP-OH-C6
12. HBP-OH-C8
13. HBP-OH-C10
14. HBP-OH-C12

Panel A

Panel B

ANTIMICROBIAL SURFACTANTS AND WATER BORNE COATINGS COMPRISING THE SAME

The invention relates to antimicrobial compounds and antimicrobial coating materials. Among other, it relates to novel antimicrobial surfactants and their application in antimicrobial coating systems, in particular water borne coatings.

Contamination by microorganisms can have dramatic impact on human life and health. During everyday routines, people continuously come into contact with a variety of surfaces that are contaminated with one or more types of microorganisms, some of which may be pathogens. Contamination with pathogenic microorganisms in such locations may result in the spread of disease and infections to people, which correspondingly endangers human lives and increases health care costs.

Antibacterial coatings, which evenly cover and adhere to a material surface by forming solid thin films, can offer an approach for limiting the spread of bacterial infections in many areas, such as daily life, medical devices, shipping, construction, and food and drug manufacturing.

Various methods have been developed for the preparation of antimicrobial polymeric coating materials. The most frequently used technique to provide antibacterial activity for coatings is the impregnation of leachable antimicrobial agents into coating materials.

Antimicrobial agents and preservatives have been used to kill or inhibit the growth of harmful microorganisms. Commonly used agents include parabens, esters of p-benzoic acid, formaldehyde releasers, isothiazolinones, organic acids, and organic alcohols. Certain metals, metal particles or metal salts, such as copper quinolinolate or silver nanoparticles, can also be used as antimicrobial agents. Some of the antimicrobial agents can be used in coatings for inhibiting the growth of microorganisms on surfaces or substrates. However, each of the antimicrobial agents has certain limitations such as biocide tolerance, public perception, toxicity (including skin irritation or sensitization), incompatibility or insolubility with other ingredients in the formulation, stability, deactivation by pH, and odor.

Waterborne coatings use water as a solvent to disperse a hydrophobic coating resin, thus making these coatings eco-friendly and easy to apply. In most cases, waterborne coatings contain up to 80% water with small quantities of other solvents, such as glycol ethers. Surfactants are indispensable in water borne coatings to keep the dispersions stable. Due to their low VOC content and potential beneficial effects to the environment, waterborne coatings are used more and more in the coating industry.

Antimicrobial waterborne coatings are known in the art. For example, US 2008/0161268 discloses is a water-borne coating material having antibiotic property, which contains 10-90 wt % of resin, 10-90 wt % of water, and 10-20000 ppm of quaternary ammonium salt antibacterial, which has a structural formula as follows:

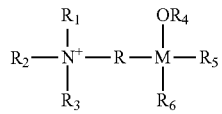

in which M represents, for example, Si; R represents a single bond or a $C_1$-$C_4$ alkyl group; $R_1$-$R_3$ are the same or different to each other and represent a $C_3$-$C_{18}$ alkyl group, respectively; $R_4$ represents a $C_1$-$C_8$ alkyl group or hydroxyl group; $R_5$-$R_6$ are the same or different to each other and represent a $C_1$-$C_8$ alkyl group, alkoxy group, or hydrogen, respectively; and X represents a halogen.

WO 2014/100778 relates to regenerable waterborne antimicrobial coating comprising, a, a metal derivative, wherein said metal derivative is a hydroxide, an oxide, or a peroxide of a metal selected from the group consisting of zinc, magnesium, titanium, and zirconium, b, a polymer, wherein said polymer is doped with 1% to 50% (w/w) of said metal derivative, and c, sequestered hydrogen peroxide.

However, currently known antimicrobial waterborne systems suffer from the drawback of loss of the biocidal compound in time. For example, leaching of the compound, either due to hydrolysis (e.g. in case of US 2008/0161268) or by release of the additives (e.g. in case of WO 2014/100778 limits a wide area of applicability.

In an attempt to provide improved antibacterial waterborne coatings, the present inventors hypothesized that an amphiphilic surfactant required to stabilize the dispersed resin could additionally serve to confer antibacterial properties to the coating. To that end, they set out to design a dual function, non-leaching surfactant capable not only of forming stable dispersed particles but also having antimicrobial activity.

This goal was surprisingly met by the provision of a novel surfactant comprising a hydrophobic hyperbranched polymer moiety functionalized with quaternary ammonium groups. The quaternary ammonium groups offer both the antibacterial properties and the polarity needed for the amphiphilic character of the surfactant. The antibacterial surfactant molecules surround the resins particles, due to their amphiphilic character. After applying the coating on a surface, the particles will merge together to form a more or less homogenous film. Without wishing to be bound by theory, most of the antimicrobial surfactant will be located at the surface.

The antibacterial surfactant of the invention is readily prepared by introducing tertiary amine groups in a hyperbranched polyurea and quaternization of said tertiary amine groups by reacting with an alkylating agent, e.g. an alkyl halide, to obtain a quaternized hyperbranched polymer having antibacterial surfactant properties.

Accordingly, in one embodiment the invention provides a method for providing an antibacterial surfactant, comprising the steps of:

(a) the polycondensation of $AB_2$ monomers to provide a hyperbranched polyurea having blocked isocyanates at the end of the polymer branches, the $AB_2$ monomers having the general formula I

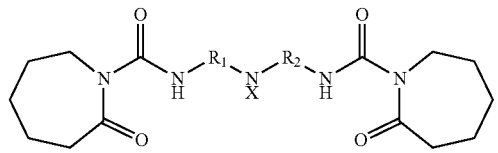

Formula I wherein $R_1$ and $R_2$ are, respectively, aliphatic chains $(CH_2)_m$ and $(CH_2)_n$ wherein m and n are an integer in the range of 3 to 15, preferably 3 to 8, and wherein X is H, an aliphatic moiety or a polymerizable unit;

(b) introducing tertiary amine groups by reacting said blocked isocyanates of the hyperbranched polyurea with a specific functionalized t-amine compound as disclosed herein below; and (c) quaternization of said tertiary amine groups by reacting with an alkylating agent to obtain a quaternized hyperbranched polymer having antibacterial surfactant properties.

It was found that an antimicrobial surfactant of the invention is capable of killing bacteria and fungi. Accordingly, as used herein, the term "antimicrobial" encompasses both bactericidal, bacteriostatic, fungicidal, fungistatic, yeast-cidal and yeast static effects.

Amphiphilic hyperbranched polymers based on the above $AB_2$ monomers are known as such in the art. For example, Xiang et al. (Macromolecules, 2013, 46 (11), pp 4418-4425) disclose a method to synthesize $AB_2$ monomers, the corresponding hyperbranched and the corresponding amphiphilic hyperbranched polymers in a one-pot procedure, starting from two commercial available compounds. Coupling of a range of monomethoxy-poly(ethylene glycol)s onto the blocked isocyanates on the end groups of the hyperbranched polyurea yielded a platform of amphiphilic hyperbranched polymers, with controllable hydrophobic cores and hydrophilic shells. Xiang et al. focus on applications in drug delivery and are silent about antibacterial surfactants or the introduction of quaternary ammonium groups in the amphiphiles.

Antibacterial coatings based on hyperbranched polyurea are also known in the art. Asri et al. (2014; Adv. Funct. Mater., 24: 346-355) describe the preparation of a shape-adaptive, contact-killing coating by tethering quaternary-ammonium-compounds onto hyperbranched polyurea coatings, able to kill adhering bacteria by partially enveloping them. However, the hyperbranched polyurea of Asri et al. is anchored covalently grafted onto silanol groups of a glass surface and quaternization is performed in a traditional 2-step alkylation procedure. Moreover, in that case polyethyleneimine was used, which is not applicable here as it will crosslink the hyperbranched polymer surfactants.

Asri (PhD Thesis, 1 Jan. 2014; XP055357752) relates to coating a silicon substrate with polyurea hyperbranched polymers having antibacterial properties. Specifically disclosed is a method wherein a glass slide coated with hyperbranched polyureas is reacted with NH2-PMOX-DDA$^+$ or ethoquad C/25. A method for providing a quaternized hyperbranched polymer having antimicrobial surfactant properties using a specific tertiary amine compound according to the present invention is not disclosed or suggested.

Step a) of a method of the invention comprises providing a hyperbranched polyurea having blocked isocyanates at the end of the each polymer branch by the polycondensation of $AB_2$ monomers. The $AB_2$ monomers comprise a secondary amine as the A-groups and blocked isocyanates as the B-groups. More specifically, the $AB_2$ monomers have the general formula

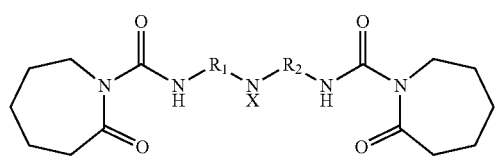

wherein $R_1$ and $R_2$ are, respectively, aliphatic chains $(CH_2)m$ and $(CH_2)n$ wherein m and n are an integer in the range of 3 to 15, preferably 3 to 8. The values of m and n can be the same or they can be different. Preferably, m and n are the same such that $R_1$ and $R_2$ are the same. In a specific aspect, m and n are 6.

X may be H, an aliphatic moiety or a polymerizable unit that allows for use of the resulting antibacterial amphiphile as built-in surfactant. In one embodiment X is H. In another embodiment, X is a polymerizable unit, preferably selected from the group consisting of (substituted) styrene, acrylates, methacrylates, vinylethers, and unsaturated fatty acids. In these cases the latter $AB_2$ monomers are copolymerized with $AB_2$ monomers in which X=H.

Methods to prepare $AB_2$ monomers were previously disclosed in the art. See Maier et al. (Angew. Chem. Int. Ed. 2003, 42, 5094-5097) or Xiang et al. (Macromolecules, 2013, 46 (11), pp 4418-4425). For example, $AB_2$ monomers can be obtained in nearly quantitative yields when stoichiometric amounts of a triamine, e.g. bis(hexamethylene) triamine (BHMTA), and carbonyl biscaprolactam (CBC) are heated at 80° C. for 6 h. During this reaction, only the primary amino groups of BHMTA react with CBC, producing automatically $AB_2$ monomers, in which the A-group is a secondary amine and the B-groups are blocked isocyanates. See Scheme 1 for the preparation of exemplary $AB_2$ monomers from triamines and carbonyl biscaprolactam.

Scheme 1

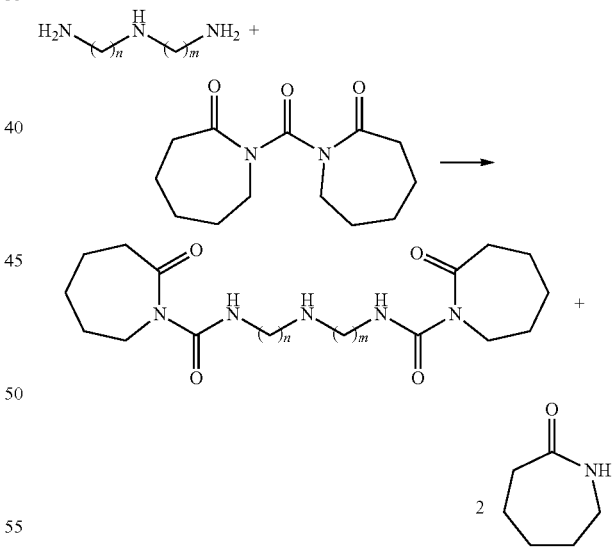

After preparation and optionally purification of the monomers, the polycondensation can proceed subsequently by heating the $AB_2$ monomers, e.g. at a temperature of 140-150° C. The resulting hyperbranched polymers contain blocked isocyanates (BIs) at the end of each polymer branch. See Scheme 2 for the product resulting from the polycondensation of $AB_2$ monomers wherein m=n=6 and X is H, yielding hyperbranched polymers (HBP).

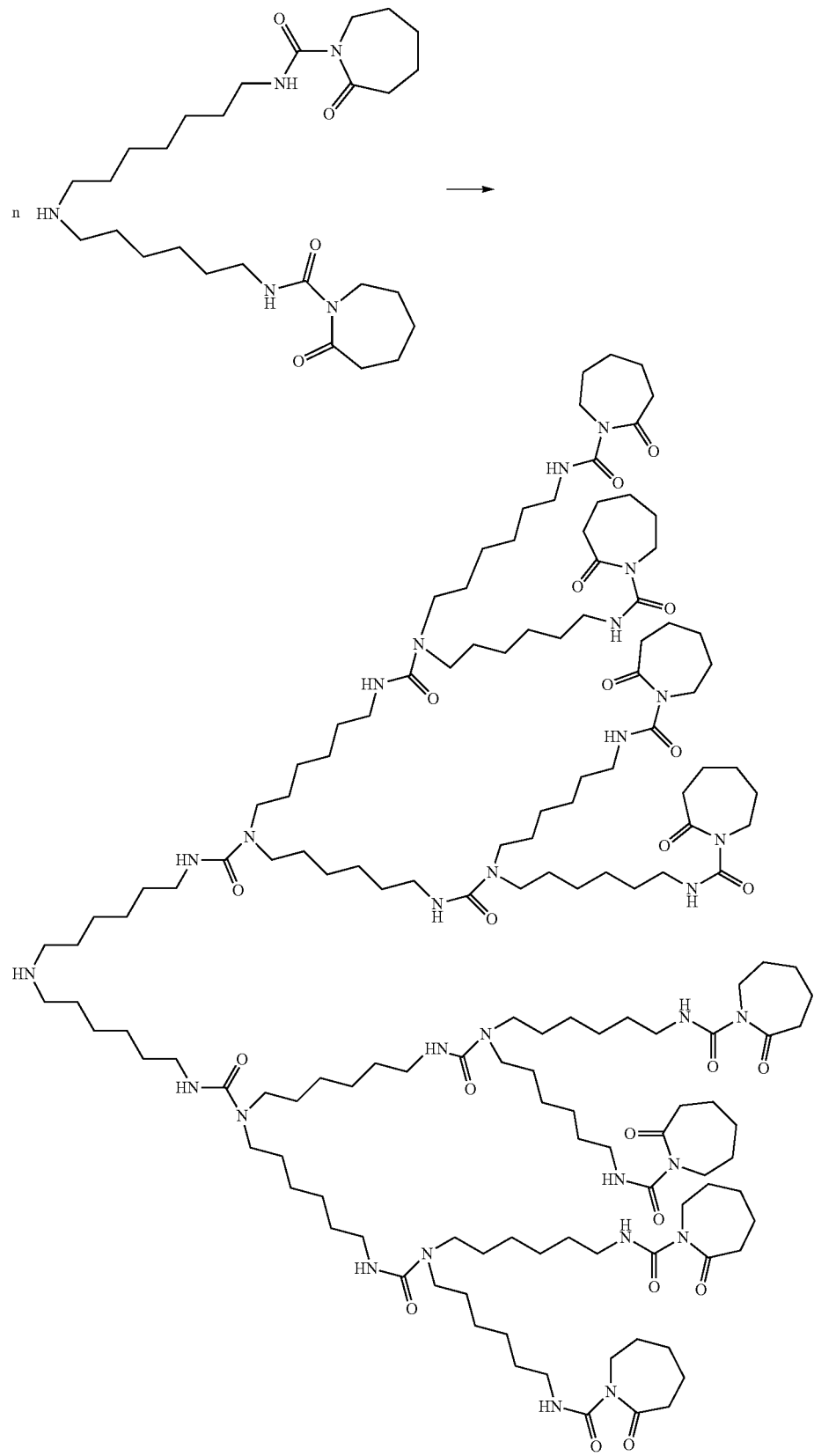

The molecular weight of the HBP, represented mainly by the hydrophobic part of the surfactant, can be changed at will. It was observed that the focal point can easily be functionalized and that the numerous blocked isocyanates allow coupling of any compound comprising a —NH$_2$, —NHR, —OH, —SH or —C(O)O— functionality. This opens up a convenient way to introduce tertiary amines that can serve as a basis for the hydrophilic quaternary ammonium groups.

Accordingly, step (b) of a method of the invention comprises introducing tertiary amine groups by reacting the blocked isocyanates of the hyperbranched polyurea with a functionalized tertiary amine compound.

In one embodiment, step (b) comprises reacting blocked isocyanates of the hyperbranched polyurea with a functionalized tertiary amine compound of the general formula
(a) Y—(CH$_2$)$_n$—NR$^1$R$^2$.
(b) Y—(CH$_2$)$_n$—((CH$_2$CH$_2$)$_t$N(alkyl))$_s$Q, or
(c) Y—(CH$_2$)$_n$(N(CH$_2$CH$_2$)$_2$NR')$_m$Q,
wherein Y is —OH, —NH$_2$, —NHR$^3$, —SH, or —C(O)O$^-$, wherein R$^3$ is C1-C10 alkyl, preferably C1-C3 alkyl; n=2-12; R$^1$ and R$^2$ are independently selected from H and alkyl, provided that at least one of R$^1$ and R$^2$ is alkyl; alkyl=C$_2$-C$_{16}$ alkyl; s=1-30; m=1-30; t=1-8; and wherein in case of (b) Q=end group, e.g. NR$_1$R$_2$ or OCH$_3$ and in case of (c) Q=H or alkyl chain with C$_2$-C$_{16}$ carbon atoms and R'=alkyl chain with C$_2$-C$_{16}$ carbon atoms.

For example, the functionalized t-amine compound is of the general formula (a) Y—(CH$_2$)$_n$—NR$^1$R$^2$ wherein Y is —OH, —NH$_2$, —SH, —NHR$^3$ or —C(O)O—, R$^1$ and R$^2$ are independently selected from H and alkyl, provided that at least one of R$^1$ and R$^2$ is alkyl, preferably C1-C10, e.g. C1-C3 alkyl; wherein R$^3$ is C1-C10 alkyl, preferably C1-C3 alkyl; and wherein n=2-12. Preferably, alkyl is a C$_2$-C$_{16}$ alkyl, more preferably a C$_4$-C$_{12}$ alkyl. In one embodiment, Y is —OH and both R$^1$ and R$^2$ are alkyl. In another embodiment, Y is —NH$_2$ and one of R$^1$ and R$^2$ is H, the other being alkyl. In yet another embodiment, Y is NHR$^3$, preferably wherein R$^3$ is C1-C3 alkyl.

In one embodiment, the functionalized t-amine compound is of the general formula Y—(CH$_2$)$_n$—NR$^1$R$^2$ wherein Y is —OH, —NH$_2$, —SH, or —C(O)O, R$^1$ and R$^2$ are independently selected from H and alkyl, provided that at least one of R$^1$ and R$^2$ is alkyl; and wherein n=2-12. For example, alkyl is a C$_2$-C$_{16}$ alkyl, preferably a C$_4$-C$_{12}$ alkyl. In one embodiment, Y is —OH and both R$^1$ and R$^2$ are alkyl. In another embodiment, Y is —NH$_2$ and one of R$^1$ and R$^2$ is H, the other being alkyl.

In a preferred aspect, the functionalized tertiary amine compound is an amine- or hydroxide-functionalized tertiary amine compound.

In one specific embodiment, the amine- or hydroxide-functionalized amine compound for use in step (b) is N,N-dimethylethene diamine (DMEN), N,N-dimethylpropylene diamine (DMPN) or 3-(dimethylamino)-1-propanol (DAMP). Alternatively, step (b) may comprises the use of N,N,N'-trimethyl-1,3-propane diamine as functionalized tertiary amine compound.

In one embodiment the functionalized t-amine compound is of the general formula (b) Y—(CH$_2$)$_n$—((CH$_2$CH$_2$)$_t$N (alkyl))sQ, in which Y is —OH, —NH$_2$, —NHR, —SH, or —C(O)O$^-$, wherein R$^3$ is C1-C10 alkyl, preferably C1-C3 alkyl; n=2-12, alkyl=C$_2$-C$_{16}$, s=1-30, t=1-8 and Q=end group, e.g. NR$^1$R$^2$ or OCH$_3$.

In a specific aspect, the invention provides a method for providing an antimicrobial surfactant, comprising the steps of (a) providing a hyperbranched polyurea having blocked isocyanates at the end of the polymer branches by the polycondensation of AB$_2$ monomers, the AB$_2$ monomers having the general formula I, wherein R$_1$ and R$_2$ are, respectively, aliphatic chains (CH$_2$)$_m$ and (CH$_2$)$_n$ wherein m and n are an integer in the range of 3 to 15, preferably 3 to 8, and wherein X is a polymerizable unit, preferably styrene; and (b) introducing tertiary amine groups by reacting said blocked isocyanates of the hyperbranched polyurea with a the functionalized t-amine is a compound with a general formula Y—(CH$_2$)$_n$—NR$^1$R$^2$ wherein Y is —NHR$^3$, R$^1$ and R$^2$ are independently selected from H and alkyl, provided that at least one of R$^1$ and R$^2$ is alkyl, preferably C1-C10, e.g. C1-C3 alkyl; wherein R$^3$ is C1-C10 alkyl, preferably C1-C3 alkyl; and wherein n=2-12. See Example 18 herein below.

In another embodiment the functionalized t-amine is a compound with a general formula Y—(CH$_2$)n(N(CH$_2$CH$_2$)$_2$NR')$_m$Q, in which Y is —OH, —NH$_2$, —NHR$^3$, —SH, or —C(O)O$^-$, wherein R$^3$ is C1-C10 alkyl, preferably C1-C3 alkyl; =2-12, m=1-30, and Q=H or alkyl chain with C$_2$-C$_{16}$ carbon atoms and R'=alkyl chain with C$_2$-C$_{16}$ carbon atoms.

In yet another embodiment the functionalized t-amine is a compound with a general formula Y—(CH$_2$)n(N (CH$_2$CH$_2$SO$_2$CH$_2$H$_2$)$_2$NR')$_m$Q, in which Y is —OH, —NH$_2$, —NHR$^3$, —SH, or —C(O)O$^-$, wherein R$^3$ is C1-C10 alkyl, preferably C1-C3 alkyl; n=2-12, m=1-30, and Q=H or alkyl chain with C$_2$-C$_{16}$ carbon atoms and R'=linear or cyclic alkyl chain with C$_2$-C$_{16}$ carbon atoms.

In another embodiment, the t-amines are quaternized before the coupling onto the HBP for Y=—OH, —SH, —CO(O)— or —NZ, in which Z is protecting group.

Optionally apart of a number of t-amines a hydrophilic compound can be coupled as well onto the polyfunctional HBPs, for example monomethoxypolyethylene glycol. The hydrophilic compound can react with a limited number of the blocked isocyanates of the HBP before, during or after the reaction with the functional t-amines.

The Y-group can substitute caprolactam from the HBP, yielding t-amine functionalized hyperbranched polymers. For the hydroxide-functionalized compound a metal (e.g. tin) catalyst may be used to speed up the reaction. It was surprisingly found that the amine-functionalized compound does not need a catalyst. Scheme 3 shows modification of HBP with exemplary hydroxyl (bottom, left) or amine (bottom, right) functionalized t-amines.

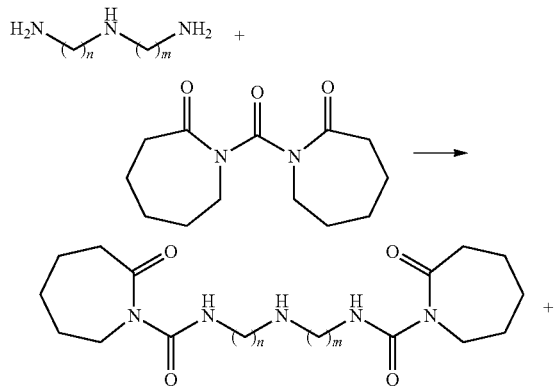

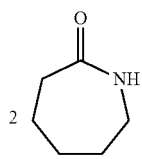

halide to temperatures up to about 120° C., preferably between about 40° C. and 80° C. The reactants are maintained at the desired temperature up to about 14 hours, and preferably from about 2 to about 10 hours, or until the reaction is to a desired level or completed. Generally, the reaction is complete when the tertiary amine value is approximately zero. This point can be determined by appropriate analytical techniques.

Scheme 3

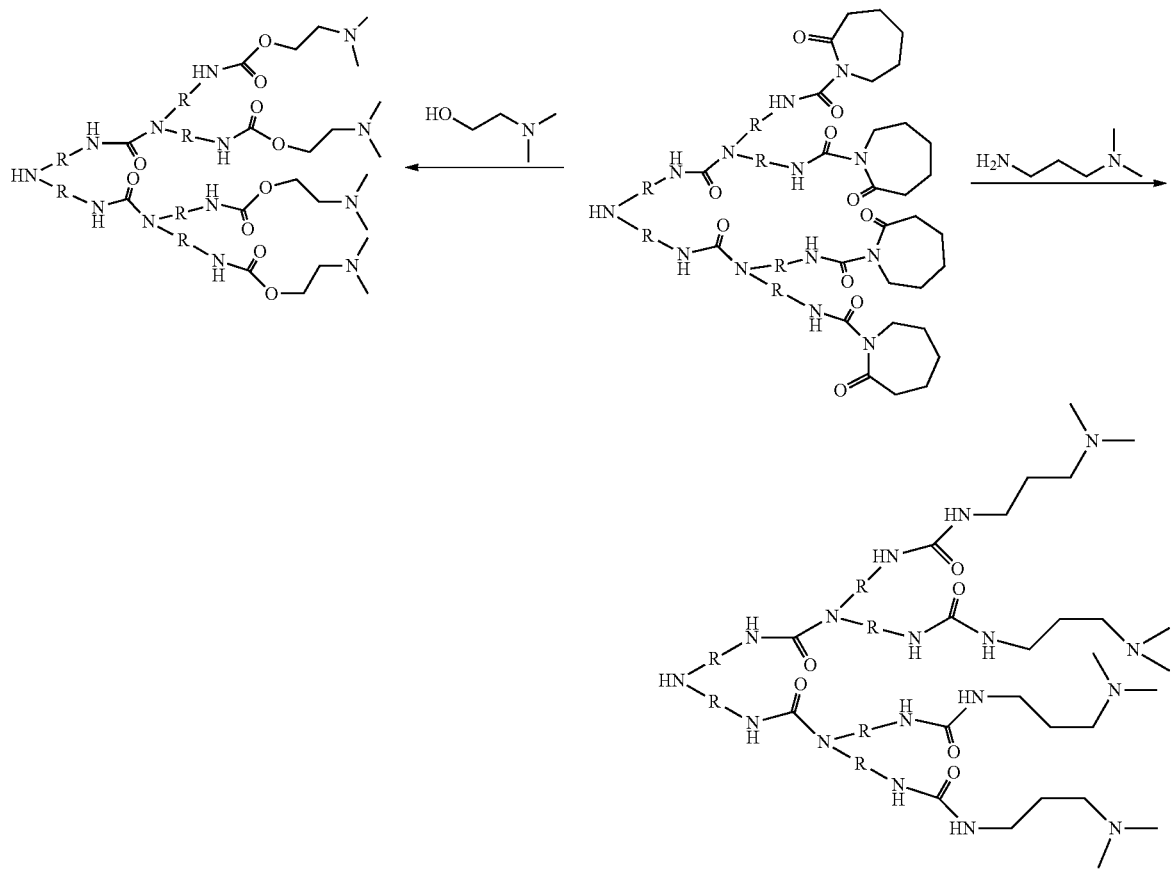

The t-amine functionalized hyperbranched polymers obtained in step (b) are subsequently quaternized with an alkylating compound to form the antibacterial surfactant. Hence, step (c) comprises quaternization of said tertiary amine groups by reacting with an alkylating compound, such as dimethyl sulfate or alkyl halide to obtain a quaternized hyperbranched polymer having antibacterial surfactant properties.

Methods for quaternization of amines are well known to those having ordinary skill in the art. The quaternization processes can be performed within a variety of pressure and temperature ranges, and at different molar ratios between the amine and the quaternizing agent. The rate of reaction is influenced by a number of factors, including basicity of the amine, steric effects, reactivity of the alkylating agent and the polarity of the solvent. Polar solvents promote the reactions by stabilizing the ionic intermediates and products. Quaternization of tertiary amines with alkyl halides is a bimolecular reaction. In general, effective quaternary amines can be formed by heating the amine and e.g. an alkyl In one embodiment, quaternization comprises stirring a reaction mixture comprising the t-amine functionalized HBP and the alkylating agent in a suitable solvent (e.g. dry DMF) overnight with a reflux condenser.

The alkylating agent may comprise a linear alkyl moiety of 1 to 16 carbon atoms, preferably 2 to 12 carbon atoms. The counter ion may be selected from the group consisting of sulfate, chloride, bromide, iodide, or combinations thereof. Preferred alkyl halides include bromo-alkanes, like bromoethane, 1-bromobutane, 1-bromo-hexane, 1-bromooctane, 1-bromodecane and 1-bromododecane.

See FIG. 1 for exemplary quaternized hyperbranched polymers 1 through 12, carrying alkyl moieties of varying chain length (R is $C_1$, $C_2$, $C_4$, $C_6$ $C_8$, $C_{10}$ or $C_{12}$).

All reactions steps of a method of the invention can be performed with a purification step after each reaction using procedures known in the art. However, it was surprisingly noticed that the yields of each of all steps was very high, and that very few undesired side-products were formed (e.g. caprolactam). What is more, it was found that it is feasible to perform steps (a), (b) and (c) without intermediate purification steps as a one-pot procedure. See example 6 herein below. Accordingly, in one embodiment a method of the invention comprises performing steps (a), (b) and (c) as a one-pot procedure. The reaction conditions were the same as in the multi-step procedure, with exception that the intermediate purifications steps were omitted.

A further aspect of the invention relates to an antibacterial surfactant obtainable by a method according to the invention. As will be appreciated by the person skilled in the art, the exact structure of the amphiphilic hyperbranched compound will depend on the starting materials and process conditions used. The molecular weight (p-value) depends on the polymerization time and temperature. The longer the polymerization time and the higher the temperature, the higher molecular weights are obtained.

In one embodiment, the antibacterial surfactant has a structure of the general formula II

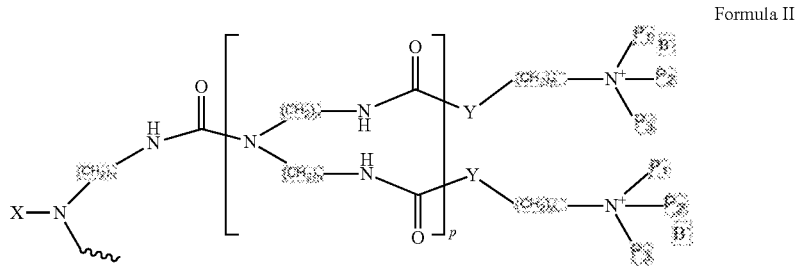

Formula II wherein
X=H, aliphatic or cyclo aliphatic chain or an unsaturated moiety
n is an integer in the range of 3-15
z is an integer in the range of 2-12
Y is O, S, C(O)O or NH
$P_1$, $P_2$ and $P_3$ are independently selected from the group consisting
of linear $C_1$-$C_{16}$ alkyl chains, preferably $C_2$-$C_{12}$ alkyl chains
p is an integer in the range of 1 to 25
B is $Br^-$, $Cl^-$, $I^-$, or $SO_4^{2-}$
$P_1$, $P_2$ and $P_3$ can be the same or distinct. Preferably, they are selected from the group consisting of C1, C2, C4, C6, C8, C10, C12 alkyl.

In one embodiment, Y=O, z=3, and $P_1$, $P_2$ and $P_3$ are selected from C1, C2, C4, C6, C8, C10 and C12 alkyl.

In another embodiment, Y=NH, z=2 or 3, and $P_1$, $P_2$ and $P_3$ are selected from C1, C2, C4, C6, C8, C10 and C12 alkyl.

As demonstrated herein below, an antibacterial surfactant of the invention is capable of forming micellar structures. The critical micelle concentration (CMC) is defined as the concentration of surfactants above which micelles form and all additional surfactants added to the system go to micelles. In one embodiment, the CMC of a surfactant of the invention is in the range of from about 0.10 to about 10 mg/mL, preferably from about 0.25 to about 5 mg/mL. The particle size of the micelles is typically in the range of between and 100 nm. However, larger agglomerates may be present as well.

Accordingly, the invention also provides a composition comprising particles comprising at least one antibacterial surfactant according to the invention. Compositions comprising a mixture of two or more distinct antimicrobial surfactants as provided herein are also envisaged as well as mixture of antimicrobial surfactants and commonly used surfactants. Of course, other types of (conventional) antibacterial agents can also be added.

Antimicrobial tests with the antimicrobial surfactants provided herein revealed that all exhibited bactericidal activity against the tested bacteria. More specifically, determination of the Minimum Inhibitory Concentration (MIC) and Minimum Bactericidal Concentration (MBC) against various bacterial strains demonstrated potent activity against clinically relevant microbes, including *S. aureus* and *S. epidermis* (ATCC12228, ATCC12600, 1457) and MRSA-resistant strains thereof, like ATCC35989 and ATCC BA-1696, *Klebsiella pneumoniae* (clinical isolate), *Acinetobacter baumannii* (clinical isolate), *Escherichia coli* ATCC 25922, *A. Baumanii* 1 and *Candida albicans* GB1/2 (yeast). Surprisingly, it was observed that methicillin resistant strains showing additional resistance to Gentamicin did not show resistance to antibacterial surfactants of the invention.

Due to more severe rule to protect the environment against the emission of volatile organic compounds and because of the need to produce coatings in an ecological responsible way, there is a strong drive to use water-based coatings. As the nature of coating resins is always hydrophobic, they are not dispersible in water without using surfactants (emulsifying) compounds. These compounds comprise a hydrophobic and a hydrophilic moiety and will cover the hydrophobic coating particles, necessary to get stable suspensions. The hydrophilic part can be ionic or non-ionic. The present invention provides a cationic surfactant that has, in addition antibacterial properties, has a dual functionality as surfactant or emulsifier. Since the surfactant is believed to be localized on the surface of the coating particles, it is in the optimal place to come in contact with bacteria after being applied as a coating. See Example 11 for an exemplary antibacterial coating. Importantly, this biocidal effect was found not to be caused by antibacterial surfactant molecules that leach from the surface (see Example 12).

A composition of the invention having these advantageous antimicrobial properties and thus finds its use in various fields.

In one embodiment, the composition is an antimicrobial coating, adhesive, paint or sealant. Preferably, it is a bactericidal paint or bactericidal coating. Preferably, the composition is a water-borne coating. Various types of waterborne coatings that are available in the market today, including water-soluble paints, water-dispersable paints and emulsions/latex paints.

Water-soluble paints contain water-soluble resins whose individual molecules dissolve completely in water. The resins are usually produced via polycondensation or polymerization reactions in bulk or in an organic medium. The coating system mostly contains some organic co-solvents like alcohols, glycol ethers or other oxygen-containing solvents that are soluble or miscible with water. The resins used include polyesters, polyacrylates, alkyds, epoxies and epoxy esters. These paints provide high gloss, a high level of corrosion protection, good pigmentability, wetting and stabilization.

Water-dispersible paints or colloidal coatings contain clusters of insoluble resin particles that are suspended in water using mechanical agitation. Small quantities of organic solvents are used as coalescing agents, which evaporate on drying. The resins used in these types of dispersion paints include polyesters, vinyl propionate copolymers, vinyl acetate copolymers, acrylate-methacrylate copolymers, and styrene-butadiene copolymers and polymers.

Emulsions/latex paints are quite similar to water-dispersible paints. The main difference is that the resin clusters in emulsions tend to be larger, and an emulsifier is required to keep the clusters in suspension. The resins used include polyesters, styrene-butadiene copolymers, acrylics, alkyds, polyvinyl acetate, and polystyrene. These paints posses increased permeability which allows them to "breathe," thus reducing blistering or peeling. In a preferred embodiment, the invention provides an emulsions/latex paint comprising an antimicrobial surfactant as herein disclosed.

In one aspect, the waterborne coating composition contains at least one antimicrobial surfactant of the invention, at least one pigment and at least one polymer latex dispersed in an evaporable medium which is predominantly composed of water. The evaporable medium may contain, in addition to water, at least one water-miscible solvent such as, for example, isopropanol, propylene glycol, ethylene glycol methyl ether, ethylene glycol butyl ether, and propylene glycol propyl ether. The waterborne coating composition contains from 10% to 70%, by volume based on the volume of the coating composition, of at least one pigment. The pigment is selected from inorganic and organic pigments such as, for example, titanium dioxide, calcium carbonate, polystyrene particles, and void-containing polymeric particles on the basis of color and opacity. Included in the term "pigment" herein are inorganic pigments sometimes referred to as fillers such as, for example, clay. In a specific aspect, titanium dioxide as a predominant pigment.

The antimicrobial (e.g. waterborne coating) composition may contain, in addition to the pigment(s) and the latex polymer, conventional coatings adjuvants such as, for example, colloids, emulsifiers, coalescing agents, curing agents, thickeners, humectants, wetting agents, biocides, plasticizers, antifoaming agents, colorants, waxes, and antioxidants. The invention additionally encompasses antimicrobial paint compositions, caulk compositions, adhesive compositions and sealant compositions, and methods of preparing such compositions. The invention specifically provides a latex paint composition comprising an antimicrobial latex prepared as described herein, a pigment, and, optionally, thickener.

An antimicrobial surfactant as provided herein is also advantageously used in a decorative paint, coil/can coating, paint packaging materials, food packaging materials, automotive paint, ink, furniture coating, coating for flooring, coating for toys, colorant for toys, colorant for cosmetics, artistic paints, colorant for coatings and paints, marine coating (anti-fouling), protective coating, wood/stone cleaning solutions, industrial in-plant cleaning solutions, floor cleaning wax, consumer soap, leather colorant, or functional materials for footwear.

In a specific embodiment, the invention provides an antimicrobial two-component coating composition. The handling of two-component coating compositions generally requires mixing together the reactive components A and B shortly before application to avoid premature reaction of the reactive components. The term "shortly before application" is well-known to a person skilled in the art handling two-component coating compositions. The time period within which the ready-to-use coating composition may be prepared prior to the actual use/application depends, e.g., on the pot life of the coating composition. Typical coating compositions of the present invention comprise 20-80% by weight, preferably 30-70% by weight of the at least one binder component A) and 20-80% by weight, preferably 30-70% by weight of the at least one cross-linking agent B), relative to the entire coating composition, and at least antimicrobial surfactant as herein disclosed.

Component A) of the coating composition according to the invention comprises monomeric, oligomeric or polymeric compounds with functional groups reactive towards isocyanate groups. These compounds can be compounds with low molar mass defined by empirical and structural formula or oligomeric or polymeric binders. The binders are compounds with a number average molar mass (Mn) of, e.g., 500 to 500,000 g/mole, preferably of 1 100 to 300,000 g/mole. Functional groups reactive towards isocyanate groups are groups with active hydrogen. The functional groups with active hydrogen may be for example hydroxyl groups, thiol groups, primary and/or secondary amino groups or combinations thereof. Compounds with hydroxyl groups and/or thiol groups are preferably used as component A). The binders with hydroxyl groups are for example the polyurethanes, (meth)acrylic copolymers, polyesters, polyethers and alkyd resins known from polyurethane chemistry to the skilled person, which are used in the formulation of organic solvent based or aqueous coating compositions.

Exemplary two-component coating compositions comprise as the B component polyisocyanates with free isocyanate groups as cross-linking agents. Examples of the polyisocyanates are any organic polyisocyanates with aliphatically, cycloaliphatically, araliphatically and/or aromatically bound free isocyanate groups. The polyisocyanates are liquid at room temperature or become liquid through the addition of organic solvents. At 23° C., the polyisocyanates generally have a viscosity of 1 to 6,000 mPas, preferably, above 5 and below 3,000 mPas. Preferred polyisocyanates are polyisocyanates or polyisocyanate mixtures with exclusively aliphatically and/or cycloaliphatically bound isocyanate groups with an average NCO functionality of 1.5 to 5, preferably 2 to 4. Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than 0.5% by weight.

The composition may be a dispersed polymer emulsion comprising an antibacterial surfactant. For example, the composition comprises a polymer produced from vinyl monomers, like styrenes, acrylates or methacrylates, or any mixtures thereof. See Examples 15-17 herein below.

Advantageously, the at least one antibacterial surfactant of the invention is covalently incorporated in said polymer by virtue of an appropriate polymerizable unit X in the $AB_2$ monomer building block. For example, in one embodiment an antimicrobial surfactant comprising a styrene unit at the focal point (X) (exemplified by the general Formula III; see also Example 18) is covalently incorporated in the polymer.

acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, hexyl acrylate, 2-ethylhexyl acrylate, 2-ethylhexyl methacrylate, t-butyl acrylate, t-butyl methacrylate, 3,3-dimethylbutyl acrylate, 3,3-dimethyl butyl methacrylate, and lauryl acrylate.

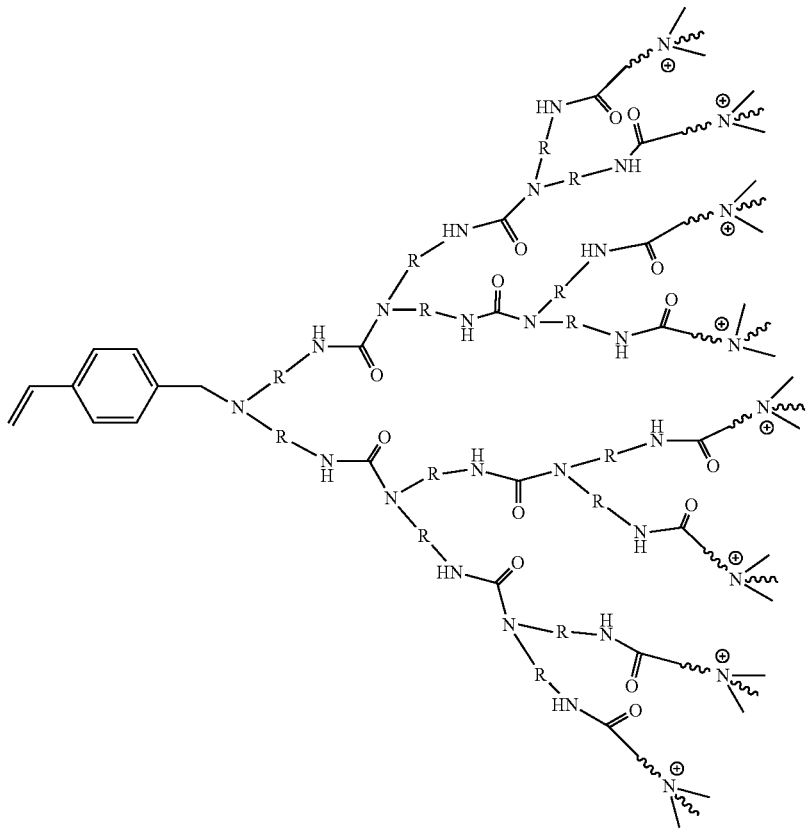

Formula III

The ethylenically unsaturated monomer or monomers that may be polymerized or co-polymerized according to the present invention are known to the art and are described below in a representative manner. Examples of suitable ethylenically unsaturated monomers are, for example, mono- and polyunsaturated hydrocarbon monomers, vinyl esters (e.g., vinyl esters of C1 to C6 saturated monocarboxylic acids), vinyl ethers, monoethylenically unsaturated mono- and polycarboxylic acids and their alkyl esters (e.g., acrylic acid esters and methacrylic acid esters, particularly C1 to C12 alkyl, and more particularly C1 to C4 alkyl esters), nitriles, vinyl and vinylidene halides, and amides of unsaturated carboxylic acids and amino monomers.

Examples of suitable hydrocarbon monomers include styrene compounds (e.g., styrene, carboxylated styrene, and alpha-methyl styrene), ethylene, propylene, butylene, and conjugated dienes (e.g., butadiene, isoprene and copolymers of butadiene and isoprene). Examples of vinyl and vinylidene halides include vinyl chloride, vinylidene chloride, vinyl fluoride and vinylidene fluoride.

Examples of acrylic esters and methacrylic esters include C1-C12 (e.g., C1-C4) alkyl acrylates and methacrylates. Typical alkyl esters and methacrylic esters include methyl Suitable vinyl esters for use in the present invention include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as allyl acetate, allyl propionate and ally lactate.

Vinyl ethers suitable for use in the present invention include methylvinyl ether, ethylvinyl ether and n-butylvinyl ether. Typically vinyl ketones include methylvinyl ketone, ethylvinyl ketone and isobutylvinyl ketone. Suitable dialkyl esters of monoethylenically unsaturated dicarboxylic acids include dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate, and dioctyl itaconate.

Monoethylenically unsaturated monocarboxylic acids include acrylic acid, methacrylic acid, ethacrylic acid, and crotonic acid. Suitable monoethylenically unsaturated dicarboxylic acids include maleic acid, fumaric acid, itaconic acid and citraconic acid. Suitable monoethylenically unsaturated tricarboxylic acids include aconitic acid and the halogen-substituted derivatives (e.g., alphachloracylic acid), and the anhydrides of these acids (e.g., maleic anhydride and citraconic anhydride).

Also provided herein is a surface provided with an antimicrobial (e.g. bactericidal) paint or (two-component) coating composition. For example, said surface is the surface of an object, a floor, a wall or part thereof, preferably a floor or a wall in a hospital, health care, day care or senior care building. The antimicrobial composition may be applied to a surface such as, for example, metal, wood, and plastic, using conventional coating application methods such as, for example, brush, roller, drawdown, dipping, curtain coater, and spraying methods such as, for example, air-assisted spray, airless spray, high volume low pressure spray, and air-assisted electrostatic spray.

The invention therefore provides the use of an antimicrobial surfactant in a water-borne coating. A further beneficial application resides in the use of an antimicrobial surfactant according to the invention to enhance the shelf life of a paint or coating composition. For example, provided herein is the use of an antimicrobial surfactant to enhance the shelf life of an antimicrobial paint, an antimicrobial coating, an antimicrobial two-component coating composition, an antimicrobial impregnate, an antimicrobial coating, an antimicrobial adhesive, an antimicrobial sealant, an antimicrobial elastomer, an antimicrobial plastic, or an antimicrobial composite material.

An antimicrobial surfactant according to the invention of course also finds its use in other type of consumer products, for example as an additive in fabrics (e.g. clothing articles like socks) or any other item that benefits from eliminating or preventing bacterial growth and odor.

LEGEND TO THE FIGURES

FIG. 1: Exemplary antimicrobial hyperbranched surfactants of the invention. Panel A: compounds (herein referred to as "HBP—NH2-Cx" wherein x denotes the alkyl chain length) obtained using an amine-functionalized tertiary amine. Panel B: compounds (herein referred to as "HBP—OH-Cx" wherein x denotes the alkyl chain length) obtained using a hydroxyl-functionalized tertiary amine. Shown are variants quaternized with alkyl groups with various chain lengths (R=C1, C2, C4, C6, C8, C10 or C12).

Figure 2:
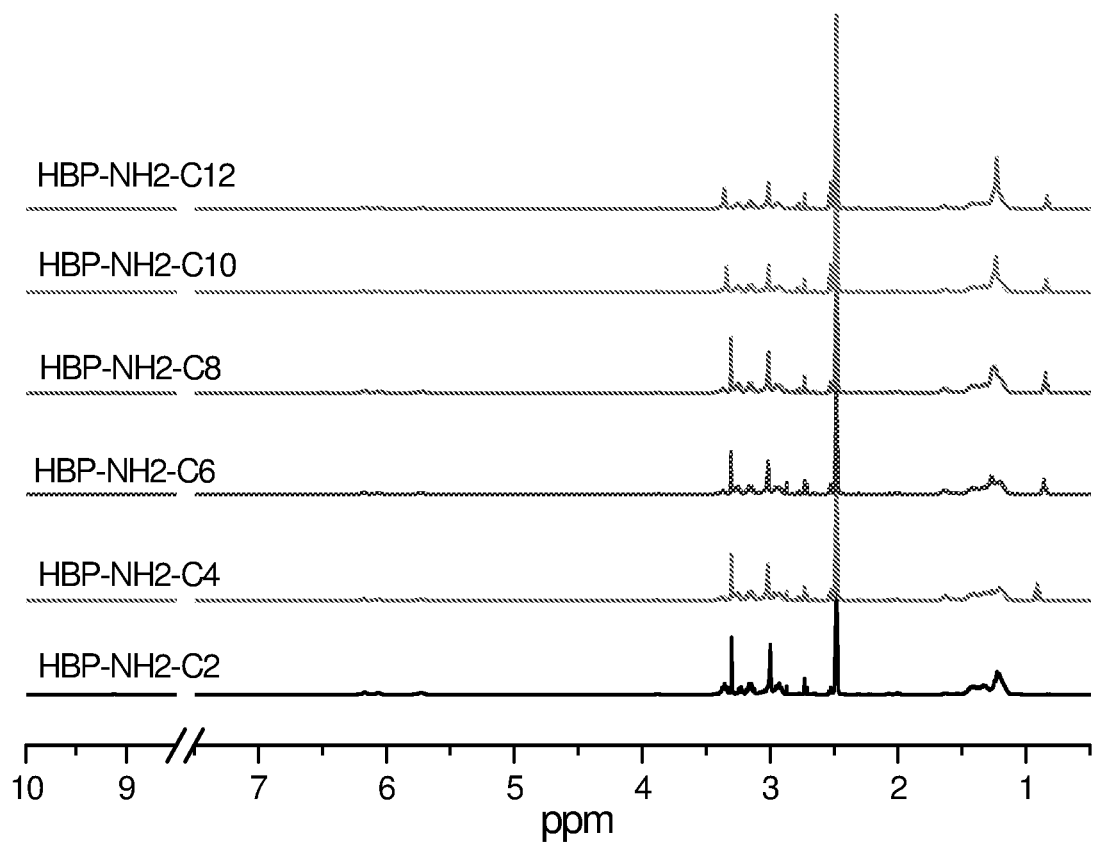

FIG. 2. $^1$H NMR spectra of exemplary surfactants HBP—NH2-Cx, wherein x is 2, 4, 6, 8, 10 or 12.

Figure 3:
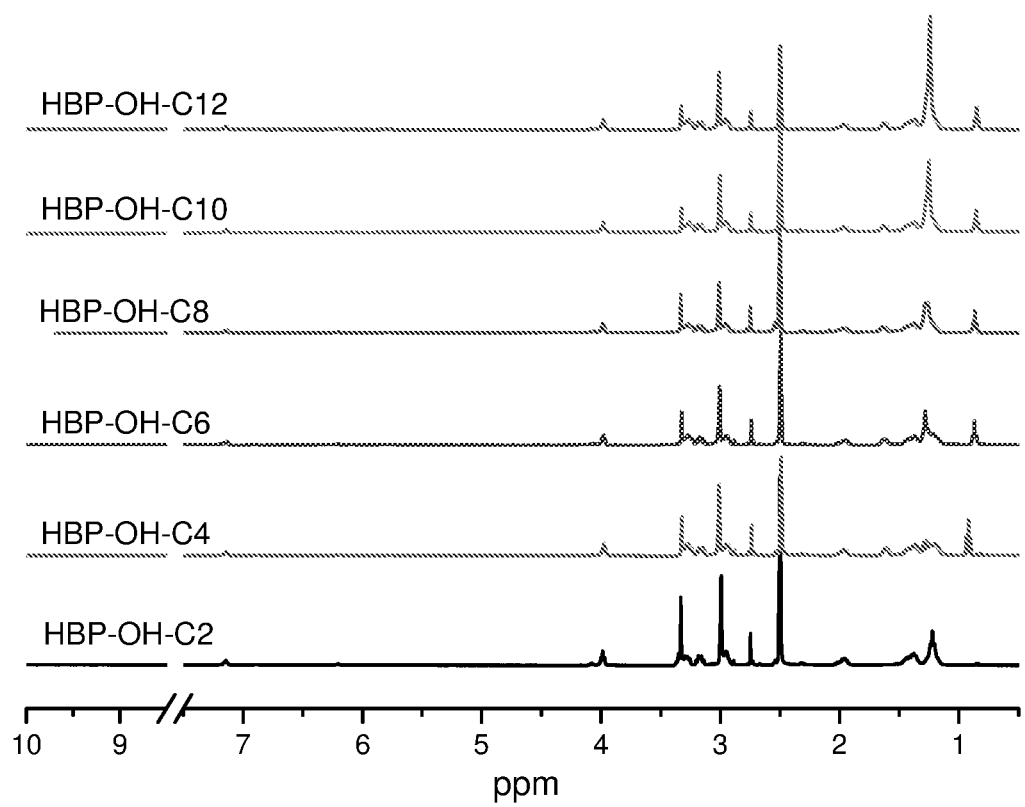

FIG. 3. $^1$H NMR spectra of exemplary surfactants HBP—OH-Cx, wherein x is 1, 2, 4, 6, 8, 10 or 12.

Figure 4:
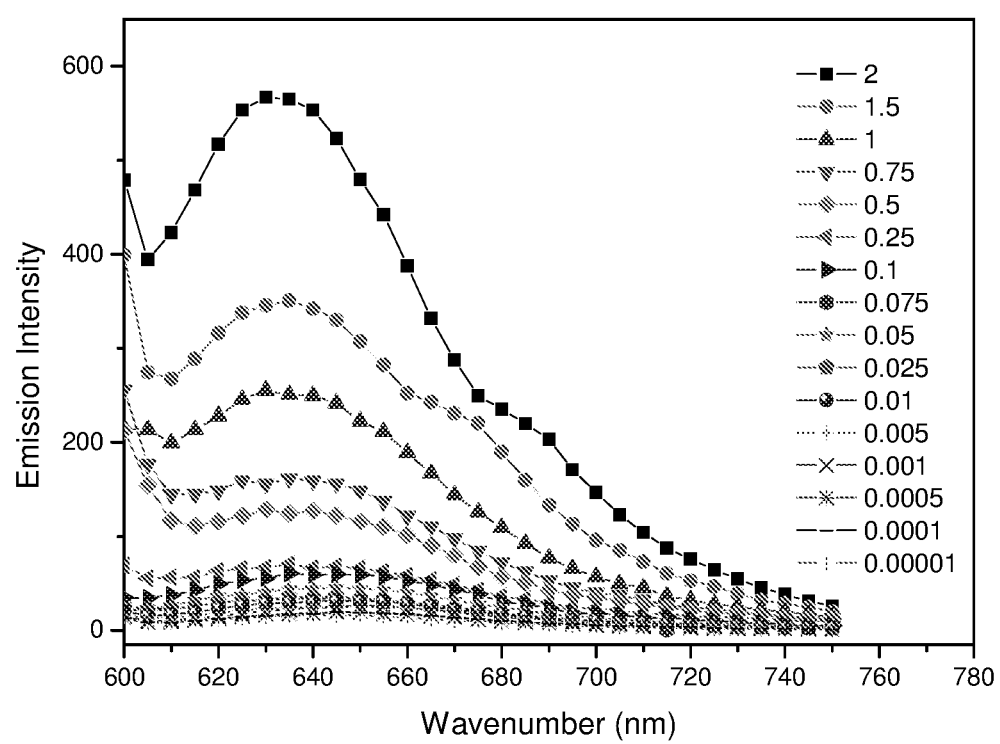

FIG. 4. Fluorescence emission spectra of Nile Red in HBP—OH—C2/water solution at varying concentrations (mg/mL).

Figure 5:
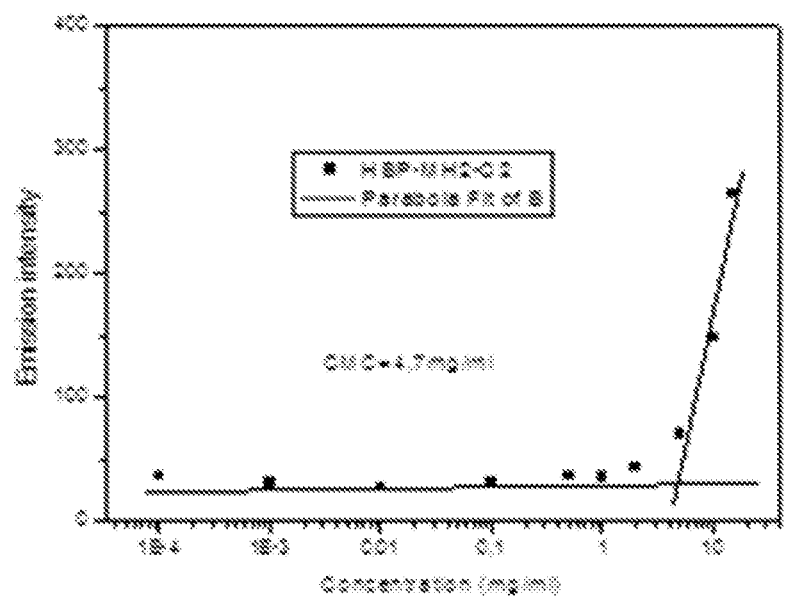
Figure 5:
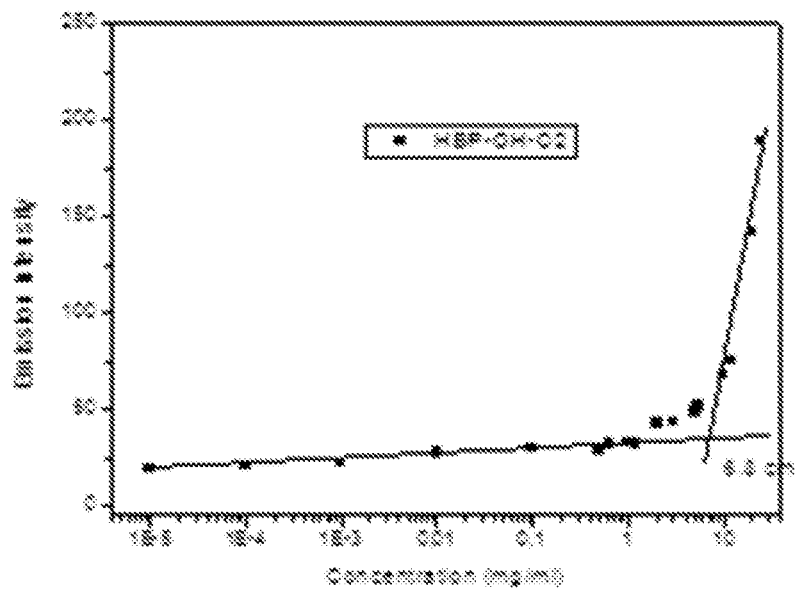

FIG. 5. Plot of maximum emission intensity of Nile Red versus the log of concentration (mg/mL) of (panel A) HBP—NH$_2$—C2/water solution or (panel B) HBP—OH—C2/water solution—

EXPERIMENTAL SECTION

Materials

Carbonyl biscaprolactam (CBC, >99%) was kindly obtained from DSM Innovation Center. Bis (hexamethylene) triamine (BHTA, high purify), N,N-dimethylethenediamine (≥DMEN, ≥98.0%), 3-(dimethylamino)-1-propanol (DMAP, 99%), Tin(II)2-ethylhexanoate (92.5-100.0%), bromoethane (98%), 1-bromobutane (99%), 1-bromohexane (98%), 1-bromooctane (99%), 1-bromodecane (98%), and 1-bromododecane (97%), Nile Red, toluene and DMF were purchased from Sigma-Aldrich. All of the chemicals were used as received and without purification.

Example 1: Synthesis of ABs Monomers

To a three-necked flask equipped with a reflux condenser, a nitrogen inlet and a connector to a vacuum pump, bis-hexamethylene triamine (BHTA, 49.5 g, 0.23 mol) and carbonyl biscaprolactam (CBC, 115.9 g, 0.46 mol) were added. After three cycles evacuating and flushing with nitrogen to remove the oxygen, the mixture was dissolved in 50 ml toluene and stirred at 80° C. overnight under nitrogen atmosphere. After the solution was cooled down to room temperature, toluene was removed under reduced pressure. Then the mixture was dissolved in 50 ml chloroform (CHCl$_3$), and washed with saturated aqueous sodium chloride solution (8×500 ml) to remove impurities. The organic layer was dried with sodium sulfate, filtered to remove the salt. The solvent was removed under reduced pressure, yielding a white solid.

$^1$H-NMR (400 MHz, CDCl$_3$): δ=1.34 to 1.56 (16H, m, CH$_2$), 1.73 (12H, m, CH$_2$ ring), 2.57 (4H, m, C$\underline{H}_2$NHC$\underline{H}_2$), 2.68 (4H, t, CH$_2$CON), 3.26 (4H, m, C$\underline{H}_2$NH CO), 3.96 (4H, t, CH$_2$NCO), 9.23 (2H, t, NHCO).

Example 2: Synthesis of Hyperbranched Polymers (HBP)

To a three-necked flask equipped with a reflux condenser, a nitrogen inlet and a connector to a vacuum pump, AB$_2$ monomers (8 g, 18.3 mmol) were added. After three cycles evacuating and flushing with nitrogen to remove the oxygen, the monomers were dissolved in 30 ml DMF and stirred at 145° C. 1 h under nitrogen atmosphere. After the solution was cooled down to room temperature, most of the DMF was removed under reduced pressure. Then the mixture was dissolved in 20 ml CHCl$_3$ and washed several times with saturated aqueous sodium chloride solution to remove the impurities and residual DMF. The organic layer was collected and dried with sodium sulfate. The salt was removed by filtration the suspension and the solvent was removed under reduced pressure. Transparent yellow resin was obtained.

$^1$H-NMR (400 MHz, DMSO): δ=1.34 to 1.56 (m, CH$_2$), 1.73 (m, CH$_2$ ring), 2.57 (m, C$\underline{H}_2$NHC$\underline{H}_2$), 2.68 (t, CH$_2$CON), 2.95 (t, C$\underline{H}_2$NHCO), 3.05 (t, CONCH$_2$), 3.26 (m, C$\underline{H}_2$NH CO-end group), 3.96 (t, CH$_2$NCO), 6.03 (NHCON), 9.23 (t, NHCO-end group). M$_n$=2,013 Da, the average polymerization degree (DP)=5.

Example 3: HBP Resin Modified with Amine-Functionalized Tertiary Amine Compound

To a three-necked flask equipped with a reflux condenser, a nitrogen inlet and a connector to a vacuum pump, HBP resin of example 2 (1.5 mmol, comprising 6 mmol blocked isocyanates) was added. After three cycles evacuating and flushing with nitrogen to remove the oxygen, N,N-dimethylethenediamine (DMEN, 27 mmol) was injected to vessel with DMF (30 ml) and stirred at 125° C. for 72 h under nitrogen atmosphere. Then the mixture was concentrated under reduced pressure to half its original volume, dissolved in 30 ml chloroform (CHCl$_3$) and washed several times with saturated aqueous sodium chloride to remove the excess DMEN, impurities and residual DMF. The organic layer was collected and dried with sodium sulfate. The salt was removed by filtration and all the solvent was removed under reduced pressure. Finally, a slightly reddish resin was obtained (HBP—NH2).

$^1$H-NMR (400 MHz, DMSO): δ=1.14 to 1.50 (m, $CH_2$), 2.11 (s, $CH_3$), 2.21 (t, C$\underline{H}_2$N($CH_3$)), 2.95, 3.05 and 3.18 ($CH_2$NCO, C$\underline{H}_2$NHCO), 5.60 to 6.02 (NHCON, NHCONH), 9.23 (t, NHCO-end group).

Example 4: HBP Resin Modified with Hydroxide-Functionalized Tertiary Amine Compound To a three-necked flask equipped with a reflux condenser, a nitrogen inlet and a connector to a vacuum pump, HBP resin of example 2 (1.5 mmol, comprising 6 mmol blocked isocyanates) was added. After three cycles evacuating and flushing with nitrogen to remove the oxygen, 3-(dimethylamino)-1-propanol (DMAP 27 mmol) and tin(II)2-ethylhexanoate (catalyst, a few drops) were injected to vessel with DMF (30 ml) and stirred at 125° C. for 72 h under nitrogen atmosphere. Then the mixture was concentrated under reduced pressure to half its original volume, dissolved in 30 ml chloroform ($CHCl_3$) and washed several times with saturated aqueous sodium chloride to remove the excess DMEN, impurity and residue DMF. The organic layer was dried with sodium sulfate. After the salt was removed by filtration off all the solvent was removed under reduced pressure. Finally, a slightly reddish resin was obtained (HBP—NH2).

$^1$H-NMR (400 MHz, DMSO): δ=1.12 to 1.55 (m, $CH_2$), 1.64 (m, OCH2C$\underline{H}$2CH2N), 2.11 (s, $CH_3$), 2.22 (t, C$\underline{H}_2$N($CH_3$)), 2.95, 3.07 and 3.18 ($CH_2$NCO, C$\underline{H}_2$NHCO), 3.93 (t, $COOCH_2$), 5.66 to 6.25 (t, NHCON), 7.05 (t, NHCOO).

Example 5: Alkylation of Tertiary Amines

To a solution of tertiary amine-functionalized HBP (0.536 mmol) in dry DMF (5 ml), an alkylating agent (4.8 mmol) was added, and the resulting mixture was stirred overnight with a reflux condenser at different temperature (45° C. for bromoethane, 60° C. for 1-bromobutane and 1-bromohexane, 70° C. for 1-bromooctane, 1-bromodecane, and 1-bromododecane). Next the solution was cool down to room temperature and dropped into diethyl ether. Then the precipitate was dissolved in $H_2O$ and washed with diethyl ether 7 times to remove all the DMF, excess of alkylating agent and other impurities. $H_2O$ phase was collected and dried with freeze-dryer. Finally, yellow waxy solids were obtained (HBP—NH2-Cx or HBP—OH-Cx, in which x is the number of carbon atoms in each alkylating agent). FIGS. 1 and 2 depict the $^1$H NMR spectra of all products.

Example 6: One-Pot Synthesis of Surfactants

For HBP—NH2-Cx Systems (C6 Exemplified)

To a three-necked flask equipped with a reflux condenser, a nitrogen inlet and a connector to a vacuum pump, bis(hexamethylene) triamine (BHTA, 28 mmol) and carbonyl biscaprolactam (CBC, 56 mmol) were added. After three cycles evacuating and flushing with nitrogen to remove the oxygen, the mixture was dissolved in 20 ml DMF and stirred at 80° C. overnight (≥8 h) under nitrogen atmosphere. Then increasing the reaction temperature to 145° C., the reaction mixture was stirred under $N_2$ atmosphere for 1 h. After that, the reaction temperature was decreased to 125° C. Meanwhile N,N-dimethylethenediamine (DMEN, 33 mmol) was injected to the flask, and stirred under N2 atmosphere for 72 h. Finally, bromohexane (49 mmol) was injected to the flask, and the reaction was stirred at 70° C. overnight to obtain the final product.

For HBP—OH-Cx Systems (C6 Exemplified)

To a three-necked flask equipped with a reflux condenser, a nitrogen inlet and a connector to a vacuum pump, bis(hexamethylene) triamine (BHTA, 28 mmol) and carbonyl biscaprolactam (CBC, 56 mmol) were added. After three cycles evacuating and flushing with nitrogen to remove the oxygen, the mixture was dissolved in 20 ml DMF and stirred at 80° C. overnight (_8 h) under nitrogen atmosphere. Then increasing the reaction temperature to 145° C., the reaction mixture was stirred under $N_2$ atmosphere for 1 h. After that, the reaction temperature was decreased to 125° C. Meanwhile 3-(dimethylamino)-1-propanol (DMAP, 33 mmol) and tin(II)2-ethylhexanoate (catalyst, 4 mmol) was injected to the flask, and stirred under N2 atmosphere for 72 h. Finally, bromohexane (49 mmol) was injected to the flask, and the reaction was stirred at 70° C. overnight to obtain the final product.

Example 7: Surfactant Characterization—Critical Micelle Concentration (CMC)

The CMC of the micelles was determined using Nile Red as fluorescence probe. First, 10 mg/ml surfactant/water solution was prepared by weighted 50 mg surfactant to 50 ml Volumetric flask. The suspension was sonicated for 10 min. 50 μL nile red/methanol solution (1 mg/ml) was taken to each Eppendorf tube with the help of Hamilton microsyringe. Methanol was removed at room temperature, then 1 mL surfactant/water solution with different concentration (2.00, 1.50, 1.00, 0.75, 0.50, 0.25, 0.10, 0.075, 0.05, 0.025, 0.01, 0.0005, 0.0001 and 0.00001) was added to each tube. After sharking at 25° C. for 3 h, the mixtures were stored overnight to enable the nile red enter into the micelles. Fluorescence spectra were recorded using a SpectraMax M3 spectrofluorometer with 96-well plates. Emission spectra were recorded from 600 to 750 nm using a $\lambda_{exc}$=560 nm. Excitation and emission slit widths were both maintained at 5.0 nm. In FIG. 3 a representative example is given of the emission spectra of one of the compounds (HBP—OH—C2).

Table 1 shows the CMC of some representative examples.

TABLE 1

| CMC results (mg/ml) for HBP-NH2-Cx and HBP-OH-Cx surfactants | | |
|---|---|---|
| Alkyl chain length | HBP-NH2_$C_x$ (mg/ml) | HBP-OH-Cx (mg/ml) |
| C2 | 4.7 | 6.8 |
| C4 | 3.7 | 4.9 |
| C6 | 1.5 | 3.7 |
| C8 | 1.2 | 2.3 |
| C10 | 0.4 | 0.5 |
| C12 | 0.1 | 0.4 |

Example 8: Antibacterial Properties

This example demonstrates the Minimum Inhibitory Concentration (MIC) and Minimum Bactericidal Concentration (MBC) of various antibacterial surfactants of the invention against various bacterial strains.

Preparation of Bacterial Strains

Bacterial strains were cultured from frozen dimethyl sulfoxide stocks on blood agar plates. Subsequently a pre-culture of 10 mL liquid growth medium was inoculated overnight at 37° C. under aerobic conditions. Next, 100 μl of the pre-culture was used to inoculate 10 ml of main culture for 24 h at 37° C. under aerobic conditions. *Streptococcus epidermidis* ATCC 12228, *Streptococcus epidermidis* ATCC 12600, *Streptococcus epidermidis* 1457 or *Streptococcus epidermidis* ATCC 35984 were all cultured with Tryptone soya broth growth medium and agar (Oxoid, Basingstoke, UK).

In case of bacterial aggregation, main cultures were sonicated 10 sec at 30 W (Vibra Cell model 375, Sonics and Materials Inc., Danbury, Conn., USA) to suspend bacterial dumps. Subsequently, the bacterial concentration was determined using the Bürker Türk counting chamber Determination of Minimum Inhibitory Concentration (MIC)

A sterile 96 wells plate (Falcon Flat bottom 353072, Tyne & Wear, United Kingdom) was used to mix 200 μl of growth medium containing the bacterial suspension at a final concentration of 105 bacteria/ml with QACs at the final concentrations ranging from 0 to 1280 μg/ml. Concentrations ranges were defined to be both below and above the Critical Micelle Concentration (CMC). Gentamicin at 10 μg/ml was used as a positive control.

The 96 wells plate was incubated for 24 h at 37° C. under aerobic conditions. Bacterial growth was examined visually for each well by assessing changes in turbidity of the suspension after 24 h. The MIC was defined as the well with the lowest QAC concentration for which no growth was observed.

Determination of Minimum Bactericidal Concentration (MBC)

Next, 100 μl of bacterial suspension from the wells that did not show any visual signs of growth was used to inoculate agar plates of the corresponding growth medium. The agar plates were incubated for 24 h and 48 h at 37° C. under aerobic conditions. The MBC was defined as the agar plate inoculated with medium with the lowest QAC concentration for which no growth was observed. Note that the methicillin resistant strains are also resistant for Gentamicin, but not against the compounds of this invention.

TABLE 2

The antibacterial effect of the surfactant series HBP-NH2-Cx and HBP-OH-Cx, wherein x is 2, 4, 6 8, 10 or 12, against *Staphylococcus Epidermidis* ATCC 12228. *S epidermidis* ATCC 12600, *S epidermidis* 1457, *S epidermidis* ATCC 35984, S aureus ATCC BAA-1696, *A baumanii* 1, *K pneumoniae* 1, *E coli* ATCC 25922, *C albicans* GB 1/2, *C parapsilosis*. *S epidermidis* ATCC 35984 and *S aureus* ATCC BAA-1696 are MRSA strains. The concentration of the antibacterial compounds is in μg/mL.

| | S epidermidis ATCC 12228 | | S epidermidis ATCC 12600 | | S epidermidis ATCC 1457 | | S epidermidis ATCC 35984 | | S aureus ATCC BAA-1696 | |
|---|---|---|---|---|---|---|---|---|---|---|
| | MIC | MBC | MIC | MBC | MIC | MBC | MIC | MBC | MIC | MBC |
| HBP-NH2-RN$^+$C$_2$ | 2560 | >2560 | 2560 | >2560 | 2560 | >2560 | 2560 | >2560 | >2560 | >2560 |
| HBP-NH2-RN$^+$C$_4$ | 1280 | 2560 | >2560 | >2560 | 2560 | 2560 | 640 | >2560 | 2560 | >2560 |
| HBP-NH2-RN$^+$C$_6$ | 40 | 320 | 160 | 320 | 40 | 320 | 40 | 320 | 80 | 640 |
| HBP-NH2-RN$^+$C$_8$ | 5 | 40 | 10 | 40 | 5 | 40 | 5 | 40 | 20 | 40 |
| HBP-NH2-RN$^+$C$_{10}$ | 5 | 20 | 10 | 20 | 5 | 40 | 5 | 10 | 10 | >20 |
| HBP-NH2-RN$^+$C$_{12}$ | 5 | 20 | 10 | 20 | 5 | 40 | 5 | 5 | 20 | 20 |
| HBP-OH-RN$^+$C$_2$ | >2560 | >2560 | >2560 | >2560 | >2560 | >2560 | >2560 | >2560 | >2560 | >2560 |
| HBP-OH-RN$^+$C$_4$ | 1280 | 2560 | >2560 | >2560 | 1280 | >2560 | 2560 | >2560 | 2560 | >2560 |
| HBP-OH-RN$^+$C$_6$ | 40 | 320 | 80 | 320 | 40 | 320 | 20 | 160 | 80 | 640 |
| HBP-OH-RN$^+$C$_8$ | 5 | 20 | 5 | 40 | 5 | 40 | 5 | 40 | 5 | 40 |
| HBP-OH-RN$^+$C$_{10}$ | 5 | 5 | 5 | 10 | 5 | 20 | 5 | 10 | 5 | 20 |
| HBP-OH-RN$^+$C$_{12}$ | 5 | 5 | 5 | 5 | 5 | 20 | 5 | 5 | 5 | 5 |
| Gentamidn 10 μg/ml | Inhibition | Bactericidal | Inhibition | Not Bactericidal | Inhibition | Bactericidal | No inhibition | Not bactericidal | Inhibition | Bactericidal |

| | A baumanii 1 | | K pneumoniae 1 | | E coli ATCC 25922 | | C albicans GB 1/2 | | C parapsilosis | |
|---|---|---|---|---|---|---|---|---|---|---|
| | MIC | MBC | MIC | MBC | MIC | MBC | MIC | MFC | MIC | MFC |
| HBP-NH2-RN$^+$C$_2$ | >2560 | >2560 | >2560 | >2560 | >2560 | >2560 | >2560 | >2560 | >2560 | >2560 |
| HBP-NH2-RN$^+$C$_4$ | >2560 | >2560 | >2560 | >2560 | >2560 | >2560 | >2560 | >2560 | >2560 | >2560 |
| HBP-NH2-RN$^+$C$_6$ | >2560 | >2560 | >2560 | >2560 | 1280 | 2560 | 2560 | 2560 | >2560 | >2560 |
| HBP-NH2-RN$^+$C$_8$ | 320 | 320 | 320 | 640 | 80 | 160 | 80 | >80 | 640 | 2560 |
| HBP-NH2-RN$^+$C$_{10}$ | 80 | 160 | 80 | 80 | 20 | 40 | 20 | 40 | 160 | 640 |
| HBP-NH2-RN$^+$C$_{12}$ | 40 | 40 | 80 | 80 | 40 | 40 | 20 | 20 | 40 | 160 |
| HBP-OH-RN$^+$C$_2$ | >2560 | >2560 | >2560 | >2560 | 640 | 640 | >2560 | >2560 | >2560 | >2560 |
| HBP-OH-RN$^+$C$_4$ | >2560 | >2560 | >2560 | >2560 | 320 | 640 | >2560 | >2560 | >2560 | >2560 |
| HBP-OH-RN$^+$C$_6$ | >2560 | >2560 | >2560 | >2560 | 160 | 320 | 1280 | 1280 | >2560 | >2560 |
| HBP-OH-RN$^+$C$_8$ | 320 | 320 | 160 | 320 | 40 | 80 | 40 | 40 | 320 | 1280 |
| HBP-OH-RN$^+$C$_{10}$ | 40 | 40 | 20 | 20 | 5 | 20 | 5 | 5 | 20 | 40 |
| HBP-OH-RN$^+$C$_{12}$ | 10 | 10 | 20 | 20 | 5 | 5 | 5 | 5 | 5 | 10 |
| Gentamidn 10 μg/ml | No inhibition | Not bactericidal | No inhibition | Not bactericidal | Inhibition | Bactericidal | No inhibition | Not fungicidal | No inhibition | Not fungicidal |

Example 9: Antimicrobial Coating Compositions

Exemplary high solid water borne polyurethane coating compositions (clear or white) were prepared. In a round bottom flask provided with a dosing funnel and a high speed dissolver (turbo mixer) the ingredients at the relative amounts as shown in Table 3 (clear coating) or Table 4 (white coating) were mixed.

TABLE 3

| Compound | function | Mass percentage |
| --- | --- | --- |
| Alberclingk U 9160 | | 80 |
| Byk 024 | Defoamer | 0.8 |
| HBP-NH2-C8 | Antimicrobial surfactant | 0.4 |
| Butylcellosolve | Solvent | 2 |
| Butylcarbitol | Coalescent | 2 |
| Water | | 14.2 |
| DSX 1514 | Thickener | 0.6 |
| | | 100 |

TABLE 4

| Compound | Function | Mass percentage |
| --- | --- | --- |
| Alberdingk U 5201 | Resin | 62.3 |
| Byk 024 | Defoamer | 0.8 |
| HBP-NH2-C8 | Antimicrobial surfactant | 0.6 |
| TiO$_2$ Kronos 2315 | White Pigment paste | 25 |
| Dowanol DPM | Film forming auxiliary | 3 |
| Water | Viscosity auxiliary | 8 |
| Rheolate 288 | Thickener | 0.3 |
| Total | | 100 |

Stable coating compositions were obtained. A 50 μm thick stable coating was applied on a glass slide with a doctor blade. After drying the coatings at 40° C., smooth coating films were obtained which could withstand 100 acetone double rubs.

Example 10: Antibacterial Coating for Flooring Applications

Different two component reactive coating compositions were prepared using a commercial reference system (blank) with and without addition of an exemplary antimicrobial surfactant of the present invention (HBP—NH2-C8). In a 100 ml container the A component binder was mixed with the dosage of antibacterial agent. After mixing in the centrifuge the appropriate amount of B component isocyanate mixture was added according to ingredients at the relative amounts as shown in Table 5 (PU7550 blank) and Table 6 (PU7550 antibacterial).

TABLE 5

| Compound | Function | Mass percentage |
| --- | --- | --- |
| PU 7750 compound A | Binder | 80 |
| PU 7750 compound B | Reactive isocyanate mixture | 20 |
| Total | | 100 |

TABLE 6

| Compound | Function | Mass percentage |
| --- | --- | --- |
| PU 7750 compound A | Binder | 78.4 |
| HBP-NH2-C8 | Antimicrobial surfactant | 1.96 |
| PU 7750 compound B | Reactive isocyanate mixture | 19.6 |
| Total | | 100 |

Stable coating compositions were obtained. The resulting mixture was poured onto a seamless floor panel and allowed to harden in a drying cabinet at ambient temperatures. The samples were allowed to fully harden during 21 days, prior to validation of antimicrobial effects.

Example 11: Antibacterial Validation of Reactive Coating Dry Film

An adjusted Japanese industrial standard method (JIS) was applied, samples were placed in a sterile petridish. 100 μL of a bacterial suspensions in PBS ($10^6$ bacteria/mL) was pipetted on top of a sterile coated sample (cut in pieces 30×30 mm). Next, the well plate was covered with sterilized Parafilm® (24×24 mm) and left to incubate at 37° C. for 24 h under humidified atmosphere. After incubation, 5 mL 0.1% (v/v) Tween80 in PBS was added to each petridish, followed by sonication for 30 s and gentle shaking for 2 min in order to dislodge adhering bacteria. The resulting suspension was serially diluted and the numbers of CFUs were determined by plate counting on agar after 24 h incubation at 37° C., from which the percentage contact-killing efficacy was calculated. Log reduction vs. inoculum values are shown in table 7.

TABLE 7

| | Log reduction vs. inoculum |
| --- | --- |
| Sample | S. epidermidis ATCC 12228 |
| Blank seamless floor | −3.5 +/− 0.5 |
| PU7550 blank | −3.5 +/− 0.5 |
| PU7550 antibacterial | 4.0 +/− 0.5 |

The PU7550 coated sample with the hyperbranched quats as an additive shows a killing effect with a maximum reduction of bacteria on the surface (no bacteria present after inoculation). Both the blank seamless floor and the blank PU7550 coated sample show growth of bacteria, confirming that the observed effect of the sample with hyperbranched quats can be attributed to the antimicrobial additive.

Example 12: Assessing Leaching of Antimicrobial Components

The JIS test was performed, but instead of using bacterial suspension, PBS was used to obtain the same exposure levels of the potential leachable as would be the case in the standard JIS testing. The extract was isolated and stored at 4° C. under $N_2$. Droplets were pipetted onto agar plates and the agar was fully covered with S. epidermidis and K. pneumoniae. The results are indicated in table 8 showing the presence of an inhibition zone yes/no.

TABLE 8

| | Log reduction vs. inoculum | |
|---|---|---|
| Sample | S. epidermidis ATCC 12228 Inhibition zone | K. pneumoniae 1 Inhibition zone |
| Blank seamless floor | No | No |
| PU7550 blank | No | No |
| PU7550 antibacterial | No | No |

The absence of an inhibition zone confirms there are no antimicrobial leachables present in a level able to reduce growth of the strains. This is the case for all of the samples, so no leachable small molecules are related to the observed effects.

Example 13: Composition of Wall Paint with Antimicrobial Additive

Exemplary wall paint coating compositions were prepared. In a paint bucket and using a high speed dissolver (turbo mixer) the ingredients were mixed at the relative amounts as shown in Table 9 (latex formulation), with and without the antibacterial surfactant (hyperbranched quats of the invention, specifically HBP—NH2-C8) or with a reference preservation (isothiazolinones) resulting in 3 samples.

TABLE 9

| Compound | Function | Mass percentage |
|---|---|---|
| Orgal PST 50A | Latex | 14.0 |
| Hecellulose H300 | Thickener | 0.35 |
| Agitan 282 | Defoamer | 0.3 |
| HBP-NH2-C8 | Antimicrobial surfactant | 0.5 |
| TiO$_2$ TR-92 | White Pigment | 8.0 |
| Omnyacarb | Filler | 44.0 |
| Ecodis P90 | Dispersing agent | 2.0 |
| Water | Viscosity auxiliary | 29.85 |
| Texanol | Coalescing agent | 1.0 |
| Total | | 100 |

Stable coating compositions were obtained. The coatings were stored and cooled immediately after preparation.

Example 14: Validation of In-Can Preservation of Latex Paints

In can preservation was tested in line with the ISO 11930 protocol. Bacterial strains were collected from the factory environment and identified using Maldi-TOF. The strains were purified and cultured. The latex formulation samples (300 gram each) were contaminated with 1.5 ml of bacterial suspension with a load of $1.5 \cdot 10^7$ cells/gram and split in multiple sterile containers. Controls were prepared without contamination. The test was performed in duplicate. The resulting suspension was serially diluted and the numbers of CFUs were determined by plate counting on agar after 0 days, 1 day, 14 days and 28 days of incubation at 25° C. Results of the enumeration of bacteria (log CFU/g) are shown in table 10.

TABLE 10

| | t = 0 days | t = 1 day | t = 14 days | t = 28 days |
|---|---|---|---|---|
| Latex formulation No preservation | 7.0 | 7.1 | 7.4 | 5.9 |
| Latex formulation Reference preservation | 7.0 | 7.0 | 3.5 | 3.5 |
| Latex formulation Antibacterial surfactant of the invention | 7.0 | 7.0 | 2.9 | 2.9 |

The results show that the in-can preservation effect of the antibacterial according to the invention is at least similar and even slightly better compared to the reference preservation system using isothiazolinones.

Example 15: Suspension Polymerization

In a flask of 250 mL 5 g MMA, 0.05 g hyperbranched surfactant of the invention (HBP—NH$_2$—C$_8$), 1 g benzoyl peroxide and 96 mL water were mixed. The mixture was heated to 80° C., while stirring (2200 rpm) for 6 h (094-A). Under the same conditions 25 g MMA, 0.1 g hyperbranched surfactant (HBP—NH$_2$—C$_8$), 1 g benzoyl peroxide and 74 mL water were added and polymerized at 80° C. for 6 h (094-E). The suspensions were stable for at least one month.

Example 16: Comparative Example

In a flask of 250 mL 5 g MMA, 0.05 g polyvinyl alcohol (PVA) 1 g benzoyl peroxide and 96 mL water were mixed. The mixture was heated to 80° C., while stirring (2200 rpm) for 6 h (101-A). Under the same conditions 25 g MMA, 0.1 g polyvinyl alcohol, 1 g benzoyl peroxide and 74 mL water were added and polymerized at 80° C. for 6 h (101-E). The suspension was stable for at least one month.

Example 17: Antibacterial Properties (MIC)

The minimum inhibitor concentrations (MIC) of resulting suspensions of Example 15 and 16 were measured with S. epidermidis (table 11).

The MIC value gives the concentration of biocidal compounds that inhibits growth of bacteria (in a solution of 105 bacteria/mL).

TABLE 11

MIC values of various polymer suspensions with S. epidermidis ATCC 12228 ($10^5$ bacteria/mL).

| Sample | MMA (g) | Surfactant * | Reaction T ° C. | MIC# µg/mL |
|---|---|---|---|---|
| 094-A | 5 | C8 | 80 | 8/8 |
| 094-E | 25 | C8 | 80 | 8/8 |
| 101-A | 5 | PVA | 80 | >670 |
| 101-E | 25 | PVA | 80 | >670 |

* C8 is hyperbranched surfactant provided with dimethyl, octyl as alkyl groups on the N$^+$ atom.
MIC = minimum inhibition concentration. The MIC is expressed as µg/mL of the surfactant.

These results demonstrate that the suspension prepared according to the invention, with the surfactant comprising quaternary ammonium moieties results in a inhibition of bacterial growth. In contrast, suspensions prepared under the same conditions with polyvinylalcohol as surfactant do not show any inhibition.

Example 18: Surfactant Provided with Styrene Moiety in Focal Point

The AB$_2$ monomer (4.79 g, 10 mmol) of example 1 and vinyl benzyl chloride (0.152 g, 1 mmol) were dissolved in xylene. NaHCO$_3$ (0.5 g) was added as acid scavenger. The solution was heated to 45° C. in a nitrogen atmosphere for 48 h. After salt was removed by filtration, the solution was heat to 145° C. for 2 h.

The solution was cooled down to room temperature and caprolactam was removed by extraction (3×) with an aqueous solution of 1 wt % CaCl$_2$). The solution was subsequently dried on MgSO$_4$. N,N,N'-trimethyl-1,3-propanediamine (0.70 g, 6 mmol) was added as functionalize t-amine compound, and the solution was heated for 10 h at 125° C. and cooled down to RT. To this solution 1-bromohexane (0.99 g, 6 mmol) was added and the resulting mixture was stirred overnight with a reflux condenser at 60° C.

The invention claimed is:

1. A method for providing an antimicrobial surfactant, comprising the steps of:
   (a) providing a hyperbranched polyurea having blocked isocyanates at the end of the polymer branches by the polycondensation of AB$_2$ monomers, the AB$_2$ monomers having the general formula I

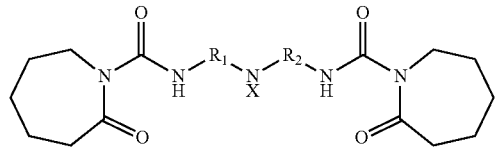

Formula I wherein R$_1$ and R$_2$ are, respectively, aliphatic chains (CH$_2$)$_m$ and (CH$_2$)$_n$ wherein m and n are an integer in the range of 3 to 15, and wherein X is H, an aliphatic moiety or a polymerizable unit;
   (b) introducing tertiary amine (t-amine) groups by reacting said blocked isocyanates of the hyperbranched polyurea with a functionalized t-amine compound of the general formula Y—(CH$_2$)$_n$—NR$^1$R$^2$ wherein
   Y is OH or —NH$_2$,
   n=2-12;
   R$^1$ and R$^2$ are independently selected from C$_1$-C$_2$ alkyl; and
   (c) quaternization of said t-amine groups by reacting with an alkylating agent to obtain a quaternized hyperbranched polymer having antimicrobial surfactant properties wherein said alkylating agent comprises a linear alkyl moiety of 8 to 12 carbon atoms.

2. An antimicrobial surfactant obtainable by a method comprising the steps of:
   (a) providing a hyperbranched polyurea having polymer branches with ends, and having blocked isocyanates at the ends of the polymer branches, the hyperbranched polyurea synthesized by polycondensation of AB$_2$ monomers, the AB$_2$ monomers having a structure of the general formula I

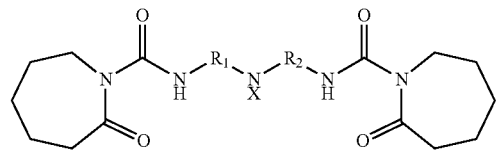

Formula I wherein R$_1$ and R$_2$ are, respectively, aliphatic chains (CH$_2$)$_m$ and (CH$_2$)$_n$ wherein m and n are integers in the range of 3 to 15, and wherein X is H, an aliphatic moiety or a polymerizable unit;
   (b) introducing tertiary amine (t-amine) groups by reacting said blocked isocyanates of the hyperbranched polyurea with a functionalized t-amine compound of the general formula Y—(CH$_2$)$_n$—NR$^1$R$^2$ wherein
   Y is —OH or —NH$_2$;
   n=2-12;
   R$^1$ and R$^2$ are independently selected from C$_1$-C$_2$ alkyl; and
   (c) quaternization of said t-amine groups by reacting with an alkylating agent to obtain a quaternized hyperbranched polymer having antimicrobial surfactant properties, wherein said alkylating agent comprises a linear alkyl moiety of 8 to 12 carbon atoms.

3. Antimicrobial surfactant having a structure of the general formula II

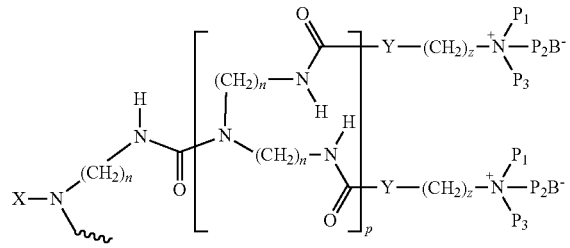

Formula II wherein
   X is H, aliphatic or cycloaliphatic chain or an unsaturated moiety;
   n is an integer in the range of 3-15;
   z is an integer in the range of 2-12;
   Y is O or NH$_2$;
   P$_1$, P$_2$ and P$_3$ are linear alkyl chains, wherein one of said P$_1$, P$_2$ and P$_3$ has a chain length of C$_8$-C$_{12}$ and the other two of P$_1$, P$_2$ and P$_3$ have a chain length of C$_1$-C$_2$;
   p is an integer in the range of 1-25; and
   B is Br$^-$, Cl$^-$, I$^-$ or SO$_4^{2-}$,
wherein the antimicrobial surfactant has a critical micelle concentration from 0.1 to 3.7 mg/mL.

4. Antimicrobial surfactant according to claim 3, wherein Y=O and z=3; or wherein Y=NH and z=2.

5. A composition comprising at least one antimicrobial surfactant according to claim 2.

6. Composition according to claim 5, wherein said composition further comprises a polymer produced from vinyl monomers, preferably styrenes, acrylates and/or methacrylates.

7. Composition according to claim 6, wherein said at least one antimicrobial surfactant is covalently incorporated in said polymer.

8. Composition according to claim 5, wherein said composition is an antimicrobial paint, an antimicrobial (two-component) coating composition, an antimicrobial impregnate, an antimicrobial adhesive, an antimicrobial sealant, an antimicrobial elastomer, an antimicrobial plastic, or an antimicrobial composite material.

9. A surface provided with an antimicrobial composition according to claim 5, preferably wherein said surface is a wall or a floor, more preferably a wall or a floor in a hospital, health care, day care or senior care building.

10. Antimicrobial surfactant according to claim 2, wherein X in step (a) is H.

11. Antimicrobial surfactant according to claim 2, wherein X in step (a) is selected from the group consisting of optionally substituted styrene, acrylate, methacrylate, vinylethers and fatty acids.

12. Antimicrobial surfactant according to claim 2, wherein said functionalized t-amine compound is N,N-dimethylethene diamine (DMEN), N,N-dimethylpropylene diamine (DMPN), 3-(dimethylamino)-1-propanol (DAMP), or N,N,N'-trimethyl-1,3-propane diamine.

13. Antimicrobial surfactant according to claim 2, wherein said alkylating agent in step (c) is an alkyl halide.

14. Antimicrobial surfactant according to claim 2, wherein steps (a), (b) and (c) are performed as a one-pot procedure.

15. Composition according to claim 5, wherein the composition is a water-born coating composition, a fabric additive, a clothing additive, a paint additive, an antimicrobial paint, an antimicrobial coating, an antimicrobial two-component coating composition, an antimicrobial impregnate, an antimicrobial adhesive, an antimicrobial sealant, an antimicrobial elastomer, an antimicrobial plastic, or an antimicrobial composite material.

16. Antimicrobial surfactant according to claim 3, wherein one of said $P_1$, $P_2$ and $P_3$ has a chain length of $C_{10}$-$C_{12}$ and the other two of $P_1$, $P_2$ and $P_3$ have a chain length of $C_1$.

* * * * *